USO10359912B2

(12) United States Patent
Alldredge et al.

(10) Patent No.: US 10,359,912 B2
(45) Date of Patent: Jul. 23, 2019

(54) METHODS AND APPARATUS FOR CONFIGURING A DATA ANALYZER

(71) Applicant: General Electric Company, Schenectady, NY (US)

(72) Inventors: Gregory Mark Alldredge, Gardnerville, NV (US); Daryl Ronald Frogget, Gardnerville, NV (US); Donald Evan Marshall, Reno, NV (US); Brian Dean Abbott, Gardnerville, NV (US); Jacqueline Marie Tappan, Minden, NV (US); John Whitney Kingham, Hadenfield, NV (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 98 days.

(21) Appl. No.: 15/349,777

(22) Filed: Nov. 11, 2016

(65) Prior Publication Data
US 2017/0060362 A1 Mar. 2, 2017

Related U.S. Application Data

(63) Continuation of application No. 13/728,302, filed on Dec. 27, 2012, now Pat. No. 9,507,484.

(51) Int. Cl.
*G06F 3/048* (2013.01)
*G06F 3/0482* (2013.01)
(Continued)

(52) U.S. Cl.
CPC ..... *G06F 3/0482* (2013.01); *G05B 19/41885* (2013.01); *G05B 23/0216* (2013.01);
(Continued)

(58) Field of Classification Search
None
See application file for complete search history.

(56) References Cited

U.S. PATENT DOCUMENTS 4,868,785 A 9/1989 Jordan et al.
5,963,884 A 10/1999 Billington et al.
(Continued)

FOREIGN PATENT DOCUMENTS

WO 0165322 A1 9/2001
WO 2012124204 A1 9/2012

OTHER PUBLICATIONS

Bently Nevada, Inc., "ANDRE SXP Dynamic Signal Processing Instrument." Copyright 2005-2012.
(Continued)

*Primary Examiner* — William C Trapanese
(74) *Attorney, Agent, or Firm* — Mintz Levin Cohn Ferris Glovsky and Popeo, P.C.

(57) ABSTRACT

A method for configuring a data analyzer is provided. The method comprises displaying to a user, on a presentation interface coupled to a processor, a graphical representation of at least a portion of the data analyzer. A data analyzer configuration for the data analyzer is then generated using a user input interface, which is coupled to the presentation interface and the processor. The presentation interface then displays to the user a plurality of selectable machine train components. The method also comprises generating, using the user input interface, an interactive graphical representation of a machine train including at least one of the selectable machine train components. Using the processor, a configuration file is generated based on the data analyzer configuration and the graphical representation of the machine train. The configuration file facilitates diagnosing operation of the machine train using the data analyzer.

26 Claims, 5 Drawing Sheets

(51) Int. Cl.
G06F 3/0481 (2013.01)
G06F 13/10 (2006.01)
G05B 19/418 (2006.01)
G05B 23/02 (2006.01)
G06F 3/0486 (2013.01)

(52) U.S. Cl.
CPC ....... *G05B 23/0272* (2013.01); *G06F 3/0481* (2013.01); *G06F 3/0486* (2013.01); *G06F 3/04817* (2013.01); *G06F 13/10* (2013.01); G05B 2219/32404 (2013.01); Y02P 90/26 (2015.11)

(56) References Cited

U.S. PATENT DOCUMENTS

| | | | |
|---|---|---|---|
| 6,192,325 | B1 | 2/2001 | Piety et al. |
| 8,275,580 | B2 | 9/2012 | Dausend et al. |
| 8,301,412 | B2 | 10/2012 | Green et al. |
| 8,311,698 | B2 | 11/2012 | Boss et al. |
| 2002/0040286 | A1 | 4/2002 | Inoko et al. |
| 2003/0023518 | A1* | 1/2003 | Spriggs .............. G05B 15/02 705/28 |
| 2012/0030648 | A1* | 2/2012 | Correll .............. G06F 8/34 717/105 |
| 2013/0031509 | A1 | 1/2013 | Curtis et al. |

OTHER PUBLICATIONS

PCT Search Report and Written Opinion issued in connection with corresponding Application No. PCT/US2013/077366 dated Apr. 9, 2014.

\* cited by examiner

METHODS AND APPARATUS FOR CONFIGURING A DATA ANALYZER

CROSS REFERENCE TO RELATED APPLICATION

This application is a continuation of U.S. patent application Ser. No. 13/728,302, entitled "Methods and Apparatus for Configuring a Data Analyzer", filed Dec. 27, 2012 and is hereby incorporated by reference in its entirety.

BACKGROUND OF THE INVENTION

The embodiments described herein relate generally to a data analyzer for use in monitoring a machine, and, more particularly, to methods and apparatus for configuring the data analyzer.

When operating machinery, it may be necessary or advantageous to monitor the operating conditions of the machine to confirm the machine is operating within pre-determined operating limitations. At least some known monitoring and diagnostic systems use transducers, or probes, to collect operational data from the machine during a diagnostic test that is compared to stored pre-determined operating limitations to determine if the machine is operating normally. Data collected during the diagnostic test is also typically stored and analyzed over time to provide additional information regarding the machine's operating condition. At least some known diagnostic systems require a user to define a configuration of the machine, its components, and the probes used to measure operating conditions on a data analyzer to facilitate data collection and analysis.

However, at least some known data analyzers may use complex computer software such that inexperienced users may define the configuration incorrectly. The complexity of known data analyzer computer software may also require that the machine and data analyzer configurations be defined before performing the diagnostic test. However, such definitions may be time-consuming and may also be complex. Furthermore, at least some known methods of defining a data analyzer configuration rely on detailed English-language descriptions of the machine and data analyzer, which may cause a non-English speaker to define the configuration inaccurately. Defining the configuration inaccurately can result in obtaining unusable diagnostic data collection. As such, the use and accuracy of known diagnostic systems may be limited.

Accordingly, what is needed is an intuitive method and apparatus for configuring the data analyzer to perform a diagnostic test on a machine. Such a method and apparatus should be language agnostic and facilitate simple configuration of the data analyzer in a relatively short period of time.

BRIEF DESCRIPTION OF THE INVENTION

In one aspect, a method for configuring a data analyzer is provided. The method comprises displaying to a user, on a presentation interface coupled to a processor, a graphical representation of at least a portion of the data analyzer. A data analyzer configuration for the data analyzer is then generated using a user input interface, which is coupled to the presentation interface and the processor. The presentation interface then displays to the user a plurality of selectable machine train components. The method also comprises generating, using the user input interface, an interactive graphical representation of a machine train including at least one of the selectable machine train components. Using the processor, a configuration file is generated based on the data analyzer configuration and the graphical representation of the machine train. The configuration file facilitates diagnosing operation of the machine train using the data analyzer.

In another aspect, a processor is provided. The processor is configured to display to a user, on a presentation interface coupled to the processor, a graphical representation of at least a portion of a data analyzer. The processor also generates, using a user input interface coupled to the presentation interface and the processor, a data analyzer configuration for the data analyzer. An interactive graphical representation of a machine train is generated using the user input interface and displayed on the presentation interface. The interactive graphical representation of the machine train comprises a plurality of selectable machine train components. The processor is further configured to generate a configuration file based on the data analyzer configuration and the graphical representation of the machine train. The configuration file facilitates diagnosing operation of the machine train using the data analyzer.

In yet another aspect, a computing device for configuring a data analyzer is provided. The computing device comprises a presentation interface, a user input interface, and a processor coupled to the presentation device and the user input device. The processor is configured to display to a user, on a presentation interface coupled to the processor, a graphical representation of at least a portion of a data analyzer. The processor also generates, using a user input interface coupled to the presentation interface and the processor, a data analyzer configuration for the data analyzer. An interactive graphical representation of a machine train is generated using the user input interface and displayed on the presentation interface. The interactive graphical representation of the machine train comprises a plurality of selectable machine train components. The processor is further configured to generate a configuration file based on the data analyzer configuration and the graphical representation of the machine train. The configuration file facilitates diagnosing operation of the machine train using the data analyzer.

DETAILED DESCRIPTION OF THE INVENTION

The apparatus and methods described herein facilitate configuring a data analyzer to enable diagnostic tests to be performed on a machine. A data analyzer configuration tool, operating on a computing device, displays various graphical representations of components of the data analyzer and the machine and allows a user to configure both the data analyzer and the machine on the tool to represent the physical equipment. After the data analyzer and the machine are configured, the data analyzer configuration tool generates a configuration file used by the data analyzer to perform the diagnostic test.

As used herein, the term "component" is an element of the data analyzer or the machine to be monitored in accordance with the diagnostic system. Motors, engines, gearboxes, pumps, fans, card types and like items are examples of components. As used herein, the term "configuration" is a detailed definition of the data analyzer or the machine comprising one or more components coupled together, such as a sampler card and a Keyphasor® card ("Keyphasor" is a registered trademark of Bently Nevada, Inc. of Nevada, United States of America) or a motor and a pump. As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

Figure 1:
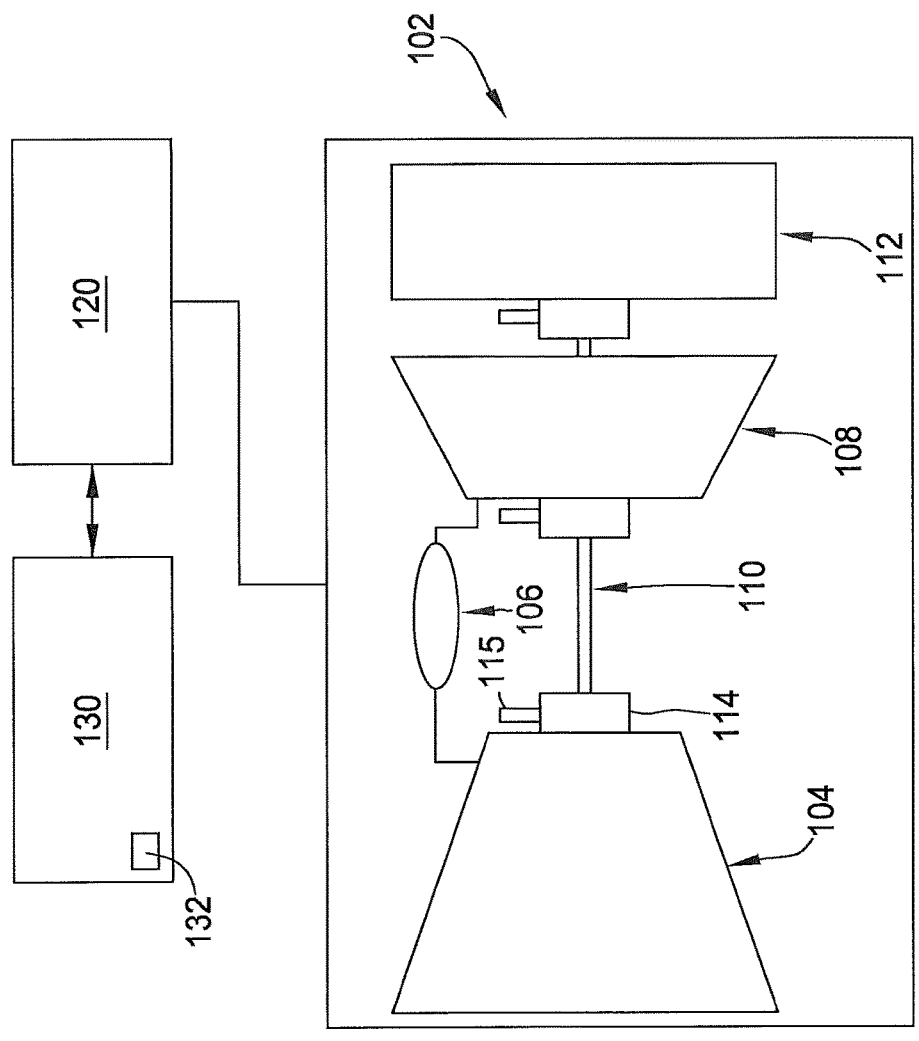
FIG. 1 is a schematic diagram of an exemplary diagnostic system.

FIG. 1 is a schematic diagram of an exemplary diagnostic system 100. In the exemplary embodiment, diagnostic system 100 includes a machine 102, such as a gas turbine engine, a data analyzer 120, and a computing device 130. In the exemplary embodiment, machine 102 includes, coupled in a serial flow arrangement, a compressor 104, a combustor assembly 106, and a turbine 108 that is rotatably coupled to compressor 104 via a rotor shaft 110. Turbine 108 may be coupled to, via shaft 110, a load 112, such as a generator for producing electricity. Machine 102 further includes a plurality of probes 115 coupled to bearings 114 that surround shaft 110. Alternatively, probes 115 may be coupled directly to shaft 110. While the exemplary embodiment is directed towards a gas turbine engine, the systems and methods described herein are not limited to any one particular engine or machine, and one of ordinary skill in the art will appreciate that the systems and methods described herein may be used in connection with other machines and/or in applications unrelated to gas turbine engines.

To monitor the operational state or health of machine 102 during operation, probes 115 are coupled to data analyzer 120. In the exemplary embodiment, probes 115 are transducers configured to measure at least one of the acceleration, velocity, and/or displacement of shaft 110 as it rotates during operation of machine 102. Alternatively, probes 115 are any type of detection device that enables diagnostic system 100 to function as described herein.

In the exemplary embodiment, data analyzer 120 is coupled to, and facilitates monitoring operation of, machine 102. Data analyzer 120 is a hardware server device that collects and/or analyzes data concerning machine 102. Specifically, data analyzer 120 receives electrical signals from probes 115 and uses those signals and the configurations defined by a data analyzer configuration tool 132 on client computing device 130 to monitor and diagnose the operation of machine 102. In at least some embodiments, data analyzer 120 is an Automated Diagnostics for Rotating Equipment (ADRE) device manufactured by Bently Nevada and data analyzer configuration tool 132 is at least a portion of ADRE Sxp software, also developed by Bently Nevada. Alternatively, data analyzer 120 may be any data analyzer or collector that enables diagnostic system 100 to function as described herein.

In the exemplary embodiment, data analyzer configuration tool 132 is an interactive drag and drop graphical user interface tool stored within computing device 130 that facilitates defining a configuration of data analyzer 120, and generating a machine train diagram (not shown in FIG. 1) of machine 102. Each configuration of data analyzer 120 and machine 102 generated by data analyzer configuration tool 132 is stored as an independent database on data analyzer 120 for use in diagnostic system 100. As described in further detail below, data analyzer configuration tool 132 provides a simple environment in which users of all experience levels can quickly generate a configuration of data analyzer 120 and generate a machine train diagram (MTD) representing machine 102 that may be saved as a configuration database on data analyzer 120 and used by diagnostic system 100. In the exemplary embodiment, computing device 130 coupled to data analyzer 120 facilitates aiding a user in generating a configuration database, as described in detail below. In the exemplary embodiment, computing device 130 is a separate component from data analyzer 120. Alternatively, computing device 130 and data analyzer 120 may both be implemented in the same hardware device.

Figure 2:
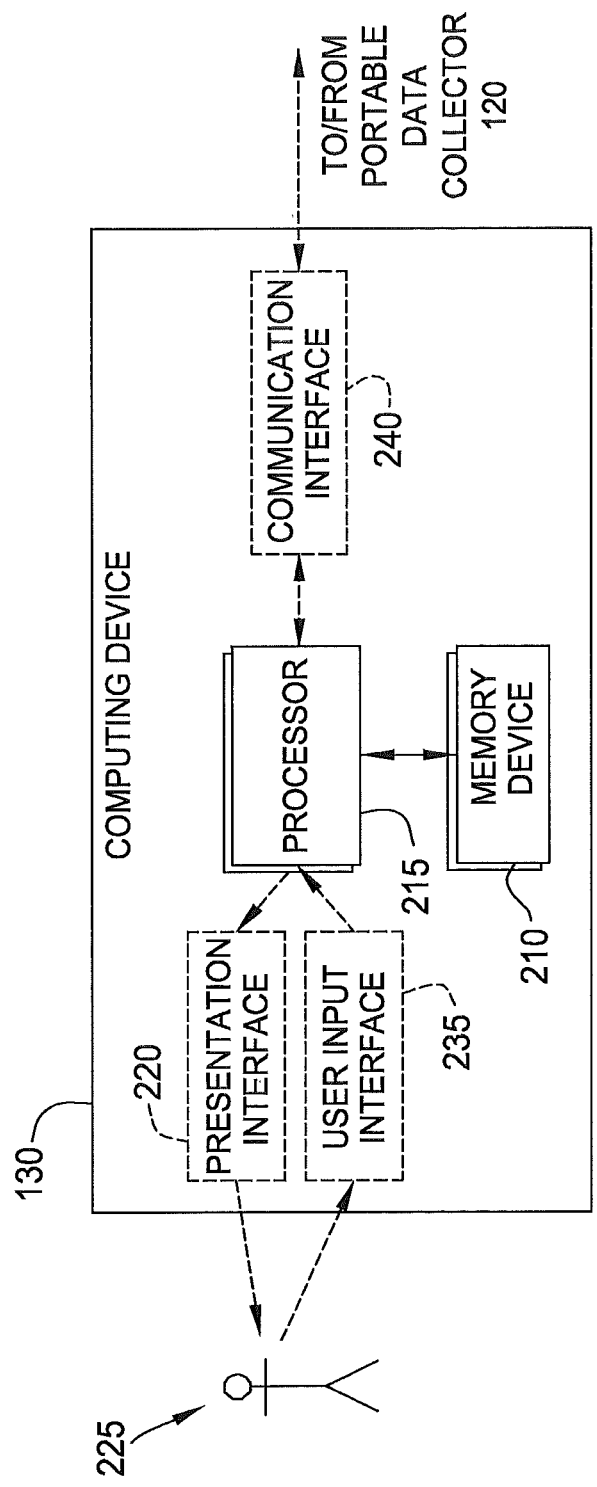
FIG. 2 is a block diagram of an exemplary computing device that may be used with the system shown in FIG. 1.

FIG. 2 is a block diagram of computing device 130 (shown in FIG. 1). Computing device 130 includes at least one memory device 210 and a processor 215 that is coupled to memory device 210 for executing instructions. In some embodiments, executable instructions are stored in memory device 210. In the exemplary embodiment, computing device 130 performs one or more operations described herein by programming processor 215. For example, processor 215 may be programmed by encoding an operation as one or more executable instructions and by providing the executable instructions in memory device 210.

Processor 215 may include one or more processing units (e.g., in a multi-core configuration). Further, processor 215 may be implemented using one or more heterogeneous processor systems in which a main processor is present with secondary processors on a single chip. As another illustrative example, processor 215 may be a symmetric multi-processor system containing multiple processors of the same type. Further, processor 215 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary embodiment, memory device 210 is one or more devices that enable information such as executable instructions and/or other data to be stored and retrieved. Memory device 210 may include one or more computer readable media, such as, without limitation, dynamic random access memory (DRAM), static random access memory (SRAM), a solid state disk, and/or a hard disk. Memory device 210 may be configured to store, without limitation, application source code, application object code, source code portions of interest, object code portions of interest, configuration data, execution events and/or any other type of data.

In some embodiments, computing device 130 includes a presentation interface 220 that is coupled to processor 215. Presentation interface 220 presents information, such as application source code and/or execution events, to a user or operator 225. For example, presentation interface 220 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 220 includes one or more display devices.

In the exemplary embodiment, computing device 130 includes a user input interface 235. In the exemplary embodiment, user input interface 235 is coupled to processor 215 and receives input from user 225. User input interface 235 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 220 and user input interface 235. Computing device 130 may include, among other possibilities, a web browser and/or a client application. Web browsers and client applications enable users, such as user 225, to display and interact with media and other information from computing device 130 and/or other control systems, such as data analyzer 120 (shown in FIG. 1).

In some embodiments, computing device 130 includes a communication interface 240 coupled to processor 215. Communication interface 240 communicates with one or more remote devices, such as data analyzer 120 over a network (not shown), such as, without limitation, the Internet, a local area network (LAN), a wide area network (WAN), a wireless LAN (WLAN), and/or a virtual private network (VPN). To communicate with remote devices, communication interface 240 may include, for example, a wired network adapter, a wireless network adapter, and/or a mobile telecommunications adapter. In the exemplary embodiment processor 215 facilitates configuring data analyzer 120 using data analyzer configuration tool 132 (shown in FIG. 1) based on input from user 225. In the exemplary embodiment, data analyzer configuration tool 132 is a computer program stored on a computer readable medium (such as memory device 210) and executed by processor 215.

Figure 3:
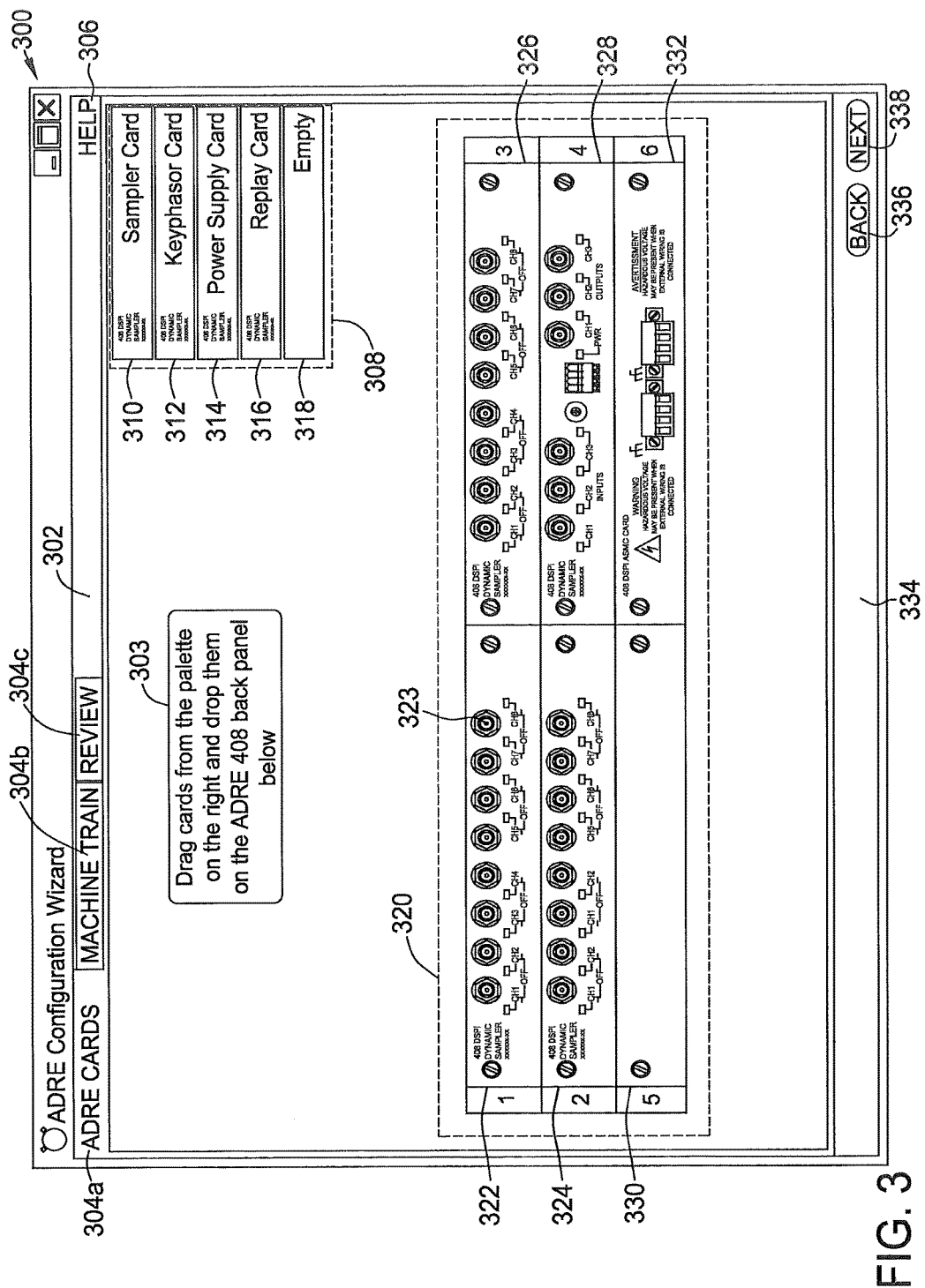
FIGS. 3-5 are exemplary screenshots of a data analyzer configuration tool that may be displayed using the computing device shown in FIG. 2.
Figure 4:
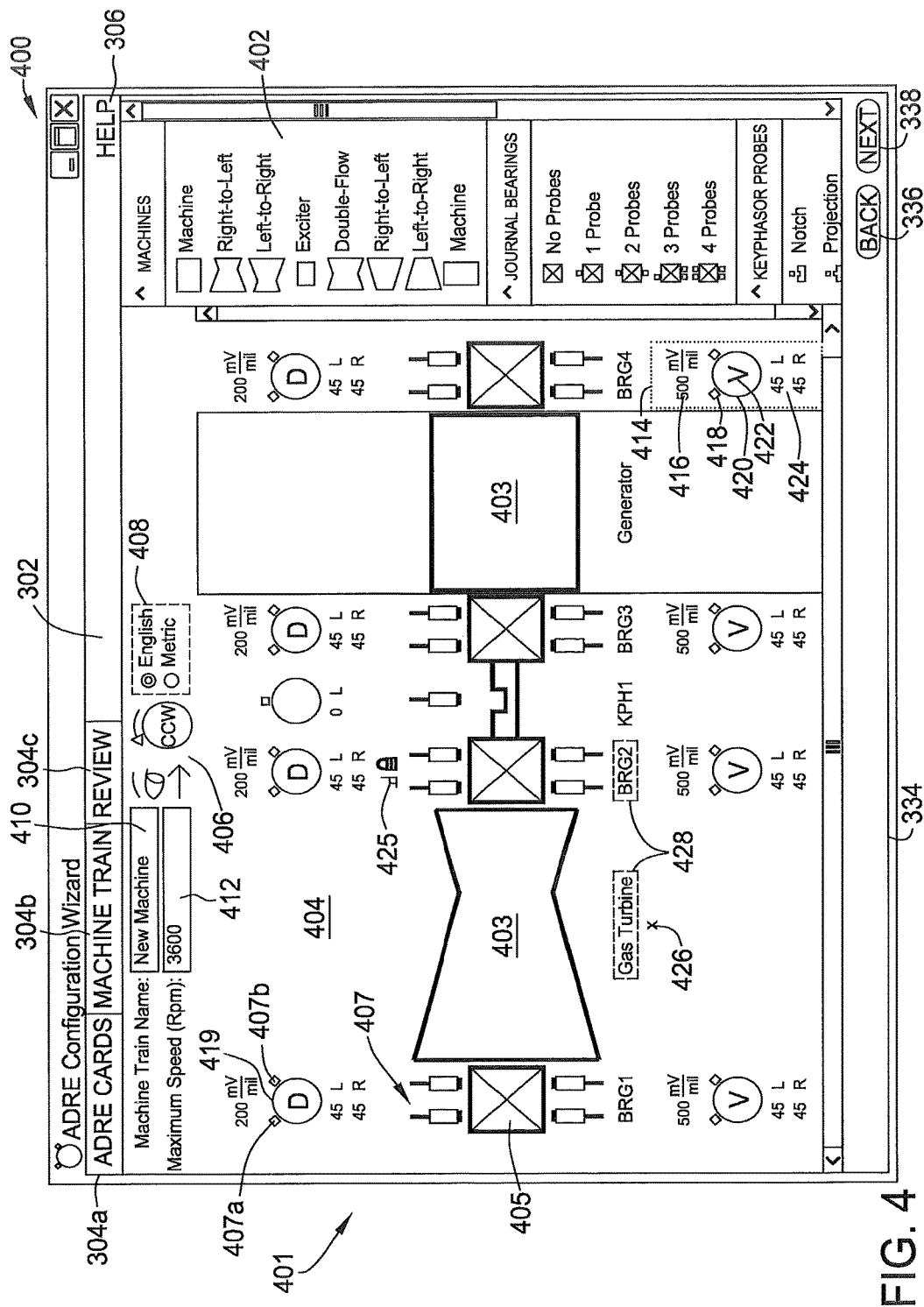
Figure 5:
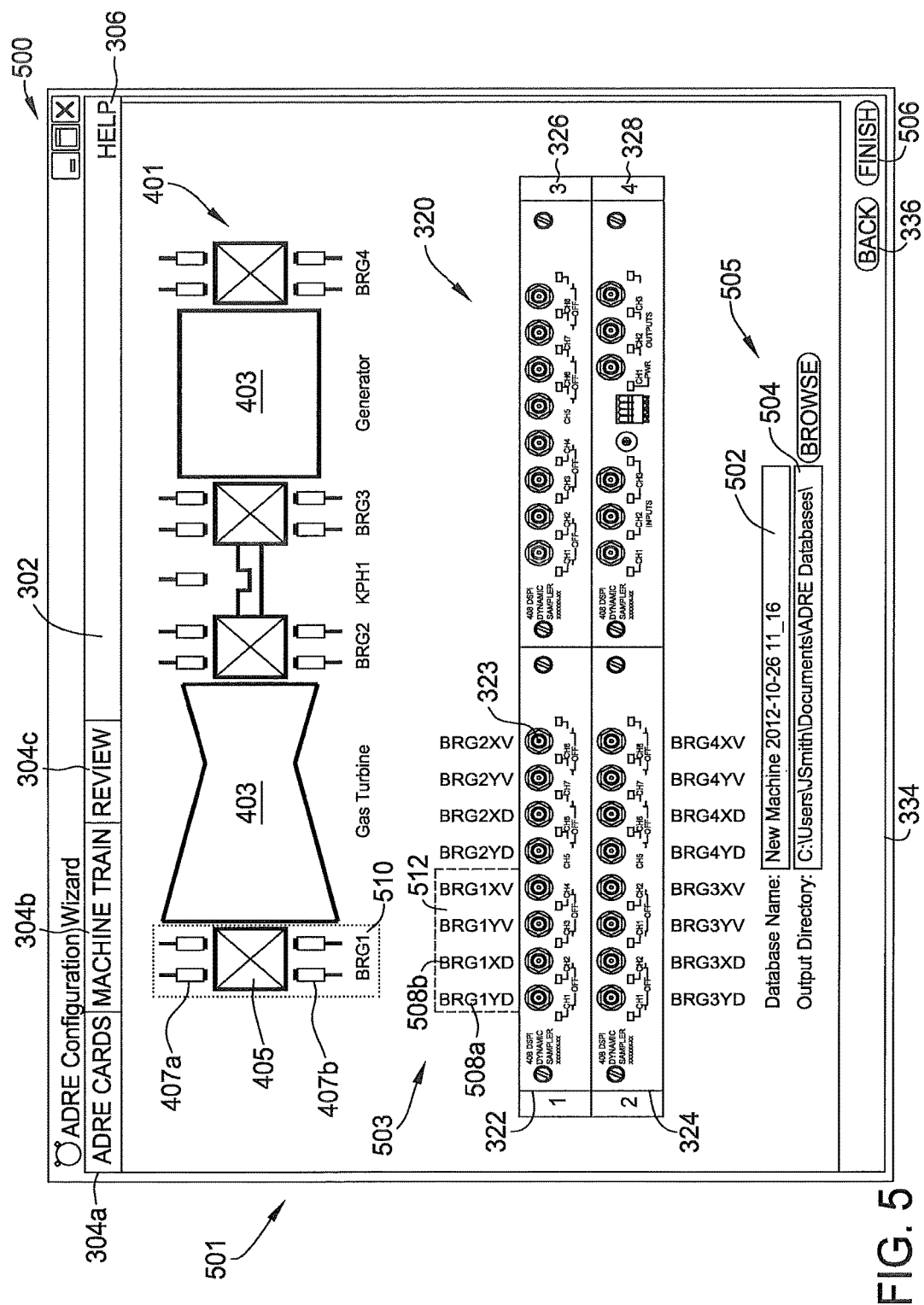

FIGS. 3-5 are images of user interface screens, or screenshots, of a typical embodiment of data analyzer configuration tool 132 (shown in FIG. 1) for configuring data analyzer 120 (shown in FIG. 1). The screens are displayed to user 225 (shown in FIG. 2) on presentation interface 220 (shown in FIG. 2) and require action by user 225 on user input interface 235 (shown in FIG. 2) to operate data analyzer configuration tool 132. FIG. 3 is an exemplary screenshot 300 that may be displayed to user 225 on presentation interface 220 of computing device 130. In the exemplary embodiment, screenshot 300 is displayed to user as part of data analyzer configuration tool 132.

Screenshot 300 displays a plurality of navigation tabs 304a, 304b, and 304c in a first navigation bar 302 to assist user 225 in navigating within data analyzer configuration tool 132. First navigation bar 302 also includes a help button 306 that user 225 may select using user input interface 235 to display a help menu (not shown). A second navigation bar 334, at the bottom of screenshot 300, displays errors or warning messages to user 225 to indicate a configuration error within data analyzer configuration tool 132. Second navigation bar 334 also includes navigation buttons 336 and 338 to facilitate navigation between a previous display screen or a subsequent display screen of data analyzer configuration. Navigation buttons 336 and 338 may be used independent from or in combination with tabs 304a, 304b, and 304c to assist user 225 in navigating within data analyzer configuration tool 132.

In the exemplary embodiment, screenshot 300 of data analyzer configuration tool 132 also displays an instruction box 303 containing instructions to user 225 illustrating how to generate a data analyzer configuration 320. Screenshot 300 displays configuration 320 including at least a portion of data analyzer 120 having a plurality of slots. In the exemplary embodiment, configuration 320 includes six slots 322, 324, 326, 328, 330, and 332. Screenshot 300 also includes a palette 308 of selectable graphical representations of data analyzer 120 components. In the exemplary embodiment, data analyzer 120 components are hardware cards 310, 312, 314, 316, and 318. Card 310 is a dynamic sampling card adapted for signal processing and containing a plurality of inputs 323 for coupling probes 115 (shown in FIG. 1) with data analyzer 120 and may be installed in any of slots 322, 324, 326, and/or 328.

Card 312 is a Keyphasor® card also containing a plurality of inputs 323 for coupling probes 115 (shown in FIG. 1) with data analyzer 120. Card 312 may be installed in any of slots 322, 324, 326, and/or 328, however data analyzer 120 supports only two Keyphasor® cards 312 per configuration 320. Card 312 is a three-channel input card that supports a variety of transducer inputs 323 and signal conditioning needs including; proximity, magnetic, optical, and laser pickups.

Card 314 is a transducer power supply card that provides power to displacement, velocity, acceleration, force hammers, and other probe 115 types used in diagnostic system 100 (shown in FIG. 1). Card 314 is configured to simultaneously power up to thirty-two probes 115 in various combinations, and provides direct physical connections for up to sixteen probes 115. Card 314 may be installed in any of slots 322, 324, 326, 328, and also slot 330 so as not to reduce the amount of slots available for sampling cards 310 or Keyphasor® cards 312.

Card 316 is a digital replay card that provides simultaneous synchronous and asynchronous internal digital reprocessing and playback of all input 323 channels in data analyzer 120. Card 316 is configured to play back raw data for all input 323 channels simultaneously including Keyphasor® card 312 and dynamic sampler card 310. In the exemplary embodiment, digital replay card 316 may be installed only in slot 330 such that the number of slots available for data collection is not reduced. Card 318 represents an empty card that user 225 may use to represent an unused slot in data analyzer 120 hardware device or to remove card 310, 312, 314, or 316 from slot 322, 324, 326, 328, or 330. Slot 332 of configuration 320 contains a system management card that is fixed in slot 332.

In the exemplary embodiment, user 225 selects one of the graphical representations of data analyzer 120 components, card 310, 312, 314, 316, or 318, from palette 308 and transfers it to one of slots 322, 324, 326, 328, 330. User 225 then repeats the transfer as desired to generate configuration 320 such that configuration 320 represents data analyzer 120 hardware device operated by user 225. In the exemplary embodiment, user 225 transfers (drags) the graphical representation of data analyzer 120 component by utilizing user input interface 235, such as, for example, but not limited to, a pointing device or a touch sensitive panel (e.g., a touch pad or a touch screen). User 225 selects data analyzer 120 component by pressing a button on pointing device 235, utilizes pointing device 235 to move the selected data analyzer 120 component from palette 308 to one of slots 322, 324, 326, 328, or 330 on configuration 320, and releases the button to complete the transfer or dragging process. For example, user 225 may select card 310 from palette 308 and transfer it to slot 322. User may then again select card 310 from palette 308 and transfer it to slot 324, and again select card 310 from palette 308 and transfer it to slot 326. User may then select card 312 from palette and transfer is to slot 326, and select card 318 to transfer to slot 330 to generate configuration 320.

In the exemplary embodiment, once card 310, 312, 314, 316, or 318 has been transferred to one of slots 322, 324, 326, 328, or 330 from palette 308, hovering pointing device 235 on top of card 310, 312, 314, 316, or 318 on image 320 displays card 310, 312, 314, 316, or 318 type and also displays an "x", which user 225 may select to remove card 310, 312, 314, 316, or 318 from slot 322, 324, 326, 328, or 330. Upon selection of the "x", data analyzer configuration tool 132 replaces removed card 310, 312, 314, 316, or 318 with empty card 318. Screenshot 300 displays generated configuration 320 based on data analyzer 120 components, cards 310, 312, 314, 316, or 318, selected and transferred from palette 308 by user 225.

FIG. 4 is an exemplary screenshot 400 that may be displayed to user 225 (shown in FIG. 2) on presentation interface 220 of computing device 130 (shown in FIG. 1). In the exemplary embodiment, screenshot 400 is displayed to user 225 as a portion of data analyzer configuration tool 132. Some elements of screenshot 400 are substantially similar to screenshot 300 (shown in FIG. 3), as such, components shown in FIG. 4 are labeled with the same reference numbers used in FIG. 3. In the exemplary embodiment, data analyzer configuration tool 132 initially displays a partially blank interactive workspace 404 on which user 225 generates an interactive machine train diagram (MTD) 401 of machine 102 (shown in FIG. 1), to be diagnosed by diagnostic system 100.

At the top of interactive workspace 404, proximate to tabs 304a, 304b, and 304c, is a machine train name editor 410 and a machine speed editor 412. Machine train name editor 410 enables user 225 to identify MTD 401 with a customized label directly on interactive workspace 404. Machine train speed editor 412 displays, and enables user 225 to modify, the operating speed of machine 102 in revolutions per minute. Screenshot 400 also displays a rotation direction indicator 406 to illustrate the direction of rotation of shaft 110 (shown in FIG. 1) with respect to the viewpoint of user 225. Proximate to rotation direction indicator 406 is a unit indicator display 408 that illustrates to user 225 the measurement system used in diagnostic system 100. Unit indicator display 408 is selectable for use between English units and Metric units.

In the exemplary embodiment, data analyzer configuration tool 132 also displays on screenshot 400 a palette 402 of selectable graphical representations of MTD 401 components. In the exemplary embodiment, MTD 401 components include, without limitation: graphical representations of machines 403 to represent machine 102 components including a turbine, a compressor, a motor, and a generator; graphical representations of bearings 405 to represent bearings 114 including journal bearings, rolling bearings, axial bearings, and couplings; and graphical representations of probes 407 to represent probes 115 including Keyphasor® probes and shaft probes. Each bearing 405 includes at least one probe 407 coupled to bearing 405. Alternatively, bearing 405 may be illustrated without probe 407. Additionally, probe 407 may be coupled directly to shaft 110 and not coupled to bearing 405. When user 225 hovers pointing device 235 on top of machine 403, bearing 405, or probe 407, data analyzer configuration tool 132 displays a description of machine 403, bearing 405, or probe 407 including machine 403, bearing 405, or probe 407 type and with how many probes 407 bearing 405 is instrumented.

In the exemplary embodiment, user 225 selects one of the graphical representations of MTD 401 components, a machine 403, a bearing 405, or a probe 407, from palette 402 and transfers the component to interactive workspace 404. User 225 then repeats the transfer using the desired machines 403, bearings 405, and/or probes 407 to generate MTD 401, such that MTD 401 represents machine 102 to be diagnosed by diagnostic system 100. In the exemplary embodiment, user 225 transfers (drags) machine 403, bearing 405, or probe 407 from palette 402 by utilizing pointing device 235. User 225 selects machine 403, bearing 405, or probe 407 by pressing a button on pointing device 235, utilizes pointing device 235 to move selected machine 403, bearing 405, or probe 407 from palette 402 to interactive workspace 404, and releases the button to complete the transfer or dragging process. Data analyzer configuration tool 132 automatically (without input from user 225) displays selected MTD 401 components horizontally across interactive workspace 404. For example, user may select bearing 405 that includes four probes 407 from palette 402 and transfer bearing 405 as described above to interactive workspace 404. User 225 may then select machine 403 from palette 402 and transfer machine 403 to interactive workspace 404. User 225 continues in such a manner until generated MTD 401 represents machine 102 to be diagnosed.

Once the desired MTD 401 components are transferred to interactive workspace 404, user 225 may modify the displayed order of MTD 401 components by selecting desired machine 403, bearing 405, or probe 407 and dragging it to an alternative position on MTD 401 within interactive workspace 404. When user 225 hovers pointing device 235 on top of machines 403, bearings 405, or probes 407 on MTD 401, data analyzer configuration tool 132 displays a description of machine 403, bearing 405, or probe 407 including machine 403, bearing 405, or probe 407 type and with how many probes 407 bearing 405 is instrumented. In addition to the description, data analyzer configuration tool 132 displays a removal button 426, such as an "x", which user 225 may select to remove machine 403, bearing 405, or probe 407 from MTD 401. Data analyzer configuration tool 132 also displays a default MTD 401 component label in a component label editor 428 for each machine 403, bearing 405, and probe 407. Component label editor 428 enables user 225 to modify the default MTD 401 component label to identify machine 403, bearing 405, and probe 407 with a customized label directly on interactive workspace 404.

In the exemplary embodiment, if bearing 405 is instrumented with at least one probe 407, or probe 407 is not coupled to bearing 405, then data analyzer configuration tool 132 displays a probe configuration tool 414 on interactive workspace 404 above and/or below MTD 401 based on the number of probes 407 coupled to bearing 405. If bearing 405 contains one or two probes 407, then probe configuration tool 414 is displayed above bearing 405. However, if bearing 405 contains three or four probes, then data analyzer configuration tool 132 displays a probe configuration tool 414 above and below bearing 405. For example, user 225 selects journal bearing 405 including four probes 407 and transfers it to interactive workspace 404. Data analyzer configuration tool 132 then displays a first probe configuration tool 414 above journal bearing 405 and a second probe configuration tool 414 below journal bearing 405.

In the exemplary embodiment, interactive probe configuration tool 414 is configured to simultaneously display on presentation interface 220: a graphical representation of shaft 420 representative of shaft 110 (shown in FIG. 1); at least one probe 407a representative of probe 115 (shown in FIG. 1) displayed relative to a circumference of shaft 420; an orientation of probe 407a relative to shaft 420; a scale factor display 416; a probe position indicator 418; a probe type indicator 422; a probe position editor 424; and a probe position lock indicator 425. In the exemplary embodiment, probe configuration tool 414 simultaneously displays an orientation of probe icon 407a and an orientation of a second probe icon 407b. Probe configuration tool 414 is described below as including probe pair 407*a* and 407*b*, but it will be understood by one having skill in the art that probe configuration tool 414 may include a single probe 407, or more than two probes 407. Probes 407*a* and 407*b* are coupled to bearing 405, and are configured to measure at least one operating parameter of shaft 110. Specifically, probes 407*a* and 407*b* are configured to measure at least one of acceleration, velocity, displacement, integrated displacement, or integrated velocity of shaft 110. Alternatively, probes 407*a* and 407*b* may measure any shaft 110 operating parameter that enables data analyzer configuration tool 132 to operate as described herein.

Scale factor display 416 displays a default scale factor and units of measure for probe pair 407*a* and 407*b*. Each probe 407*a* and 407*b* type includes a default scale factor that is modifiable according to user 225 input. User 225 may edit the default scale factor of probes 407*a* and 407*b* by utilizing pointing device 235 to select and edit the default scale factor within probe configuration tool 414 on interactive workspace 404.

Probe type indicator 422 displays a default type of probe 407*a* and 407*b* coupled to bearing 405 and which shaft 110 operating parameter probes 407*a* and 407*b* are measuring. When probes 407*a* and 407*b* are measuring the displacement of shaft 110 as it rotates, a "D" is displayed in probe type indicator 422. When probes 407*a* and 407*b* are measuring the velocity of shaft 110 as it rotates, a "V" is displayed in probe type indicator. When probes 407*a* and 407*b* are measuring the acceleration of shaft 110 as it rotates, an "A" is displayed in probe type indicator. When probes 407*a* and 407*b* are measuring the displacement integrated from the velocity of shaft 110 as it rotates, a "Di" is displayed in probe type indicator. When probes 407*a* and 407*b* are measuring the velocity integrated from the acceleration of shaft 110 as it rotates, a "Vi" is displayed in probe type indicator. In the exemplary embodiment, user 225 may change the default probe 407*a* and 407*b* type by selecting, or clicking, probe type indicator 422 with pointing device 235. Repeatedly selecting probe type indicator 422 toggles through available probe 407*a* and 407*b* types such that probe 407*a* and 407*b* type is selected based on the number of times user 225 selects probe type indicator 422. Each selection of pointing device 235 not only changes the displayed probe 407*a* and 407*b* type, but also changes scale factor display 416 to the default scale factor of probe 407*a* and 407*b* type displayed in probe type indicator 422. In the exemplary embodiment, probe type indicator 422 displays probe 407*a* and 407*b* type and facilitates determining the type of probe 407*a* and 407*b* coupled to bearing 405 on interactive workspace 404.

In the exemplary embodiment, probe configuration tool 414 graphically displays an orientation of probes 407*a* and 407*b* relative to graphical representation of shaft 420 using probe position indicator 418. Further, probe configuration tool 414 algebraically displays the orientation of probes 407*a* and 407*b* with probe position editor 424. Probe position indicator 418 graphically illustrates the location of probes 407*a* and 407*b* by displaying them with respect to graphical representation of shaft 420. Probe position editor 424 algebraically illustrates the location of probes 407*a* and 407*b* by displaying an angle value and direction from a reference point 419, the top of graphical representation of shaft 420, at which probes 407*a* and 407*b* are positioned. As used herein, the term "algebraically" is used to denote an orientation of probes 407*a* and/or 407*b* defined by an angular value and a direction of the angular value with respect to reference point 419.

In the exemplary embodiment, when bearing 405, instrumented with at least one probe pair 407*a* and 407*b*, is transferred from palette 402 to interactive workspace 404, probe configuration tool 414 displays probe 407*a* at a default location 45 degrees left of reference point 419 and displays probe 407*b* at a default location 45 degrees right of reference point 419, as illustrated by probe position editor 424 with the respective "L" or "R". In the exemplary embodiment, user 225 may change the orientation of probes 407*a* and 407*b* by selecting probe 407*a* or 407*b* with pointing device 235 and dragging it about a circumference of shaft 420. As the orientation of probes 407*a* and 407*b* changes based on the actions of user 225, probe position editor 424 simultaneously displays the angle value and direction with respect to reference point 419 of probes 407*a* and 407*b*. Alternatively, user 225 may modify the angle value of probe position editor 424 by selecting, with pointing device 235, the angle value and entering a second, different, angle value. Additionally, user 225 may alter the orientation of probes 407*a* and 407*b* with respect to reference point 419 by selecting, with pointing device 235, the displayed "L" or "R", which results in toggling the orientation of the selected probe 407*a* or 407*b* between an angle value left of reference point 419 and the same angle value right of reference point 419. Alternatively, user 225 may input an alphanumeric of the angle value and desired "L" or "R" on a second user input interface 235, such as a keyboard. Both probe position indicator 418 and probe position editor 424 illustrate a location of probes 115 (shown in FIG. 1) with respect to shaft 110 on machine 102 being diagnosed and facilitate customizing the location of probes 407*a* and 407*b* about graphical representation of shaft 420.

Probe configuration tool 414 further includes a probe position lock indicator 425. Probe position lock indicator 425 is displayed on probe configuration tool 414 when user 225 hovers pointing device 235 above any part of probe configuration tool 414 and is configured to facilitate locking probes 407*a* and 407*b* at a pre-determined angle value relative to each other such that when user 225 selects and drags one of probes 407*a* or 407*b* about a circumference of shaft 420 to change the position of probe 407*a* or 407*b*, the unselected probe 407*a* or 407*b* travels correspondingly. In the exemplary embodiment, the pre-determined angle value is 90 degrees. Alternatively, the pre-determined angle value may be any angle value that enables data analyzer configuration tool 132 to operate as described herein. User 225 may selectively toggle probe position lock indicator 425 on or off by selecting indicator 425 with pointing device 235. When probe position lock indicator 425 is toggled off, user 225 may position each probe 407*a* and 407*b* as desired independently of each other. When probe position lock indicator 425 is toggled on, modifying the position of selected probe 407*a* or 407*b*, utilizing either probe position indicator 418 or probe position editor 424, results in correspondingly changing the position of unselected probe 407*a* or 407*b*.

In the exemplary embodiment, when bearing 405, instrumented with a single probe 407, is transferred from palette 402 to interactive workspace 404, probe configuration tool 414 displays probe 407 at a default location of reference point 419, illustrated on probe position editor 424. In the exemplary embodiment, user 225 may change the location of probe 407 by selecting, or clicking, probe 407 with the pointing device and dragging it about a circumference of shaft 420. As the location of probe 407 changes based on the actions of user 225, probe position editor 424 simultaneously displays the angle value and direction with respect to reference point 419 of probe 407. Alternatively, user 225 may modify the angle value of probe position editor 424 by selecting, with the pointing device, the angle value and entering a second, different, angle value. Additionally, user 225 may alter the orientation of probe 407 with respect to reference point 419 by selecting, with the pointing device, the displayed "L" or "R", which results in toggling the orientation of the probe 407 between an angle value left of reference point 419 and the same angle value right of reference point 419. Both probe position indicator 418 and probe position editor illustrate a location of probe 407 with respect to shaft 110 on machine 102 being diagnosed and facilitate customizing the location of probes 407a and 407b about graphical representation of shaft 420.

FIG. 5 is an exemplary screenshot 500 of a review display 501 that may be displayed to user 225 (shown in FIG. 2) on presentation interface 220 (shown in FIG. 2) of computing device 130. In the exemplary embodiment, screenshot 500 is displayed to user 225 as a portion of data analyzer configuration tool 132. Some elements of screenshot 500 are substantially similar to screenshot 300 (shown in FIG. 3) and screenshot 400 (shown in FIG. 4), as such, components shown in FIG. 5 are labeled with the same reference numbers used in FIGS. 3 and 4. In the exemplary embodiment, data analyzer configuration tool 132 simultaneously displays, on review display 501, generated MTD 401 and at least a portion of data analyzer configuration 320. More specifically, review display 501 illustrates a connection configuration 503 depicting each probe 407a and 407b and its corresponding input 323 assignment on configuration 320 as determined by data analyzer configuration tool 132 based on probe 407a and 407b location in MTD 401.

Data analyzer configuration tool 132 displays, at the top of review display 501, a non-interactive graphical representation of MTD 401, including machine 403, bearing 405, and/or probe 407 labels, as generated by user 225 using data analyzer configuration tool 132 as described above. Data analyzer configuration tool 132 simultaneously displays, on review display 501 beneath MTD 401, at least a portion of data analyzer configuration 320 as generated by user 225 using data analyzer configuration tool 132 as described above. For example, review display 501 illustrates slots 322, 324, 326, and 328 containing cards 310, 310, 310, and 312, respectively. Alternatively, review display 501 may illustrate any configuration 320 of data analyzer 120 as generated by user 225. Furthermore, review display 501 includes a probe label editor 512, a configuration name editor 502 and a file destination editor 504. Configuration name editor 502 enables user 225 to identify connection configuration 503 with a customized label directly on review display 501. File destination editor 504 enables user 225 to determine the destination of a configuration file 505 generated by data analyzer configuration tool 132.

In the exemplary embodiment, review display 501 illustrates a portion 510 of MTD 401, wherein portion 510 includes bearing 405 and at least probes 407a and 407b. Data analyzer configuration tool 132 displays a probe label 508a and 508b for each probe 407a and 407b, respectively, indicating corresponding input 323 assignments as determined by data analyzer configuration tool 132 based on probe 407a and 407b location in MTD 401. Input 323 assignments are designated such that the first probes, probes 407a and 407b of portion 510, are assigned to the first inputs 323 of the corresponding card, card 310 for acceleration, velocity, or displacement probes or card 312 for Keyphasor® probes. Assignments are determined as such until each probe 407a and 407b of MTD 401 is assigned an input 323 on connection configuration 503. When input 323 assignments have been made, probe label editor 512 enables user 225 to identify probes 407a and 407b with a customized label directly on review display 501.

In the exemplary embodiment, data analyzer configuration tool 132, utilizing processor 215 (shown in FIG. 2), is configured to generate configuration file 505 based on connection configuration 503 displayed on review display 501. Configuration file 505 facilitates diagnosing operation of machine 102 using data analyzer 120. Review display 501 includes a finishing button 506 that, when selected by user 225 using pointing device 235, facilitates generating configuration file 505 for use by data analyzer 120 in diagnosing machine 102 of diagnostic system 100.

Technical effects of the methods and apparatus described herein include at least one of: (a) displaying components of a data analyzer and a machine train diagram to a user; (b) receiving input from the user that generates a connection configuration between the data analyzer and the machine train diagram; (c) generating a configuration file based on the connection configuration, wherein the configuration file facilitates diagnosing operation of the machine using the data analyzer.

As compared to known configuration systems, the apparatus and methods described herein deliver enhanced data collection functionality with continuous asset management and operating condition monitoring capabilities. The apparatus and methods described herein generate configurations of a data analyzer, a machine train, and a connection between the data analyzer and the machine train based on input received from an operator by an interactive data analyzer configuration tool. Accordingly, unlike at least some known configuration systems that require operators to possess extensive knowledge and/or experience, the apparatus and methods described herein enable relatively inexperienced operators to successfully configure a data analyzer for use in diagnostic testing. By displaying components of the data analyzer and the machine in an interactive data analyzer configuration tool, and generating a configuration based on operator input in a generally simple and straightforward drag-and-drop format, the data analyzer configuration tool significantly simplifies the process for the operator as compared to known configuration systems, thus allowing data analyzer configurations to be generated more efficiently and accurately. Further, as compared to at least some known configuration systems that rely on detailed English-language descriptions of components, the apparatus and methods described herein provide substantially visual cues that increase efficiency and accessibility of operators around the world.

The embodiments described herein enable a data analyzer to be configured with a data analyzer configuration tool in a diagnostic system. The data analyzer configuration tool, operating on a computing device, is an interactive tool that displays a portion of the data analyzer and its components and generates a data analyzer configuration based input entered by a user. The data analyzer configuration tool also displays selectable machine train components and generates a machine train diagram based on input entered by the user. The data analyzer configuration tool automatically determines a connection configuration between the data analyzer configuration and the machine train diagram, and generates a configuration file based on the connection configuration wherein the configuration file facilitates diagnosing operation of the machine train using the data analyzer.

Exemplary embodiments of methods and apparatus for configuring a data analyzer are described above in detail. The methods and apparatus are not limited to the specific embodiments described herein, but rather, components of apparatus and/or steps of the methods may be utilized independently and separately from other components and/or steps described herein. For example, the methods and apparatus described herein are not limited to use with diagnostic systems for gas turbine engines, but may be used with other monitoring and control systems in a number of different industrial applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for configuring a data analyzer, said method comprising:
    displaying to a user, on a presentation interface coupled to a processor, a graphical representation of at least a portion of the data analyzer;
    generating, using a user input interface coupled to the presentation interface and the processor, a data analyzer configuration for the data analyzer, the data analyzer configuration including a plurality of slots configured to receive selections of graphical representations of data analyzer components characterizing elements of the data analyzer, the graphical representations selected, by the user, from a palette of graphical representations of data analyzer components and transferred, by the user via the user input interface, to one of the plurality of slots;
    displaying to the user, on the presentation interface, a plurality of selectable machine train components;
    generating, using the user input interface, an interactive graphical representation of a machine train including at least one of the selectable machine train components; and
    generating, using the processor, a configuration file based on the data analyzer configuration and the graphical representation of the machine train, wherein the configuration file facilitates diagnosing operation of the machine train using the data analyzer.

2. The method of claim 1 further comprising displaying simultaneously to the user, on the presentation interface, at least a portion of the data analyzer configuration and the graphical representation of the machine train.

3. The method of claim 2 further comprising displaying a connection configuration, as determined by the processor, between the at least a portion of the data analyzer configuration and the graphical representation of the machine train.

4. The method of claim 1, wherein displaying a graphical representation of at least a portion of the data analyzer further comprises displaying a plurality of the selectable data analyzer components and a plurality of slots of the data analyzer.

5. The method of claim 4, wherein generating the data analyzer configuration further comprises selecting and dragging, with the user input interface, at least one of the plurality of selectable data analyzer components to at least one of the plurality of slots.

6. The method of claim 1, wherein generating a graphical representation of a machine train further comprises selecting and dragging, with the user input interface, at least one of the plurality of the selectable machine train components to an interactive workspace.

7. The method of claim 1 further comprising displaying at least one setting of the at least one of the plurality of selectable machine train components included in the graphical representation of the machine train, wherein the at least one setting is displayed on an interactive workspace adjacent to the graphical representation of the machine train.

8. The method of claim 7 further comprising editing the at least one setting of the at least one of the plurality of selectable machine train components on the interactive workspace as desired by the user.

9. The method of claim 1, wherein the selectable data analyzer components include a dynamic sampling card, a three-channel input card configured to support transducer inputs and signal conditioning needs, a transducer power supply card, a digital replay card, and/or an empty card.

10. The method of claim 1, wherein the palette of graphical representations is provided to the user within the user input interface and includes a list of one or more graphical representations of data analyzer components which are available to be selected for inclusion in the generated data analyzer configuration.

11. A processor configured to:
    display to a user, on a presentation interface coupled to said processor, a graphical representation of at least a portion of a data analyzer;
    generate, using a user input interface coupled to said presentation interface and said processor, a data analyzer configuration for said data analyzer, the data analyzer configuration including a plurality of slots configured to receive selections of graphical representations of data analyzer components characterizing elements of the data analyzer, the graphical representations selected, by the user, from a palette of graphical representations of data analyzer components and transferred, by the user via the user input interface, to one of the plurality of slots;
    display to the user, on said presentation interface, a plurality of selectable machine train components;
    generate, using said user input interface, an interactive graphical representation of a machine train comprising at least one of said selectable machine train components; and
    generate a configuration file based on said data analyzer configuration and said graphical representation of the machine train, wherein said configuration file facilitates diagnosing operation of the machine train using said data analyzer.

12. The processor of claim 11 further configured to determine and display a connection configuration between at least a portion of said data analyzer configuration and said graphical representation of the machine train.

13. The processor of claim 11 further configured to display a plurality of the selectable data analyzer components, wherein said graphical representation of at least a portion of the data analyzer comprises a plurality of slots.

14. The processor of claim 13 wherein said processor is configured to generate said data analyzer configuration in response to the user selecting and dragging, using said user input interface, at least one of said plurality of selectable data analyzer components to at least one of said plurality of slots.

15. The processor of claim 11 wherein said processor is configured to generate said graphical representation of the machine train in response to the user selecting and dragging, using the user input interface, at least one of said plurality of selectable machine train components to an interactive workspace.

16. The processor of claim 11 further configured to display at least one setting of at least one of said plurality of selectable machine train components included in said graphical representation of the machine train, wherein said at least one setting is displayed on an interactive workspace adjacent to said graphical representation of the machine train.

17. The processor of claim 16 further configured to edit said at least one setting of said at least one of said plurality of selectable machine train components on said interactive workspace in response to user input on said user input interface.

18. The processor of claim 11, wherein the selectable data analyzer components include a dynamic sampling card, a three-channel input card configured to support transducer inputs and signal conditioning needs, a transducer power supply card, a digital replay card, and/or an empty card.

19. The processor of claim 11, wherein the palette of graphical representations is provided to the user within the user input interface and includes a list of one or more graphical representations of data analyzer components which are available to be selected for inclusion in the generated data analyzer configuration.

20. A computing device for configuring a data analyzer, said computing device comprising:
 a presentation interface;
 a user input interface; and
 a processor coupled to said presentation device and said user input device, said processor configured to:
 display to a user, on said presentation interface, a graphical representation of at least a portion of the data analyzer;
 generate, using said user input interface, a data analyzer configuration for said data analyzer, the data analyzer configuration including a plurality of slots configured to receive selections of graphical representations of data analyzer components characterizing elements of the data analyzer, the graphical representations selected, by the user, from a palette of graphical representations of data analyzer components and transferred, by the user via the user input interface, to one of the plurality of slots;
 display to the user, on said presentation interface, a plurality of selectable machine train components;
 generate, using said user input interface, an interactive graphical representation of a machine train comprising at least one of said selectable machine train components; and
 generate a configuration file based on said data analyzer configuration and said graphical representation of the machine train, wherein said configuration file facilitates diagnosing operation of the machine train using said data analyzer.

21. The computing device of claim 20, wherein said presentation interface is configured to display simultaneously to the user at least a portion of said data analyzer configuration and said graphical representation of the machine train.

22. The computing device of claim 20, wherein said processor is configured to generate said data analyzer configuration in response to the user selecting and dragging, using said user input interface, at least one of a plurality of the selectable data analyzer components to at least one of a plurality of data analyzer slots.

23. The computing device of claim 20, wherein said processor is configured to generate said graphical representation of the machine train in response to the user selecting and dragging, using said user input interface, at least one of said plurality of selectable machine train components to an interactive workspace.

24. The computing device of claim 20, wherein said processor is configured to display at least one setting of at least one of said plurality of selectable machine train components included in said graphical representation of the machine train, and wherein said processor is configured to edit said at least one setting in response to user input on said user input interface.

25. The computing device of claim 20, wherein the selectable data analyzer components include a dynamic sampling card, a three-channel input card configured to support transducer inputs and signal conditioning needs, a transducer power supply card, a digital replay card, and/or an empty card.

26. The computing device of claim 20, wherein the palette of graphical representations is provided to the user within the user input interface and includes a list of one or more graphical representations of data analyzer components which are available to be selected fhr inclusion in the generated data analyzer configuration.

* * * * *